INVENTORS.
LLOYD A. BUCKMINSTER
WILLIAM A. WASHBURN

INVENTORS.
LLOYD A. BUCKMINSTER
WILLIAM A. WASHBURN
BY
ATTORNEY

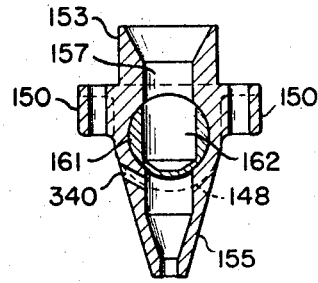
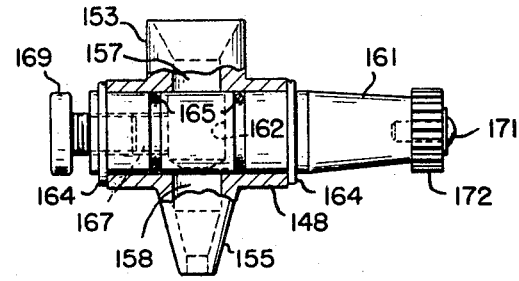
FIG.6  FIG.7
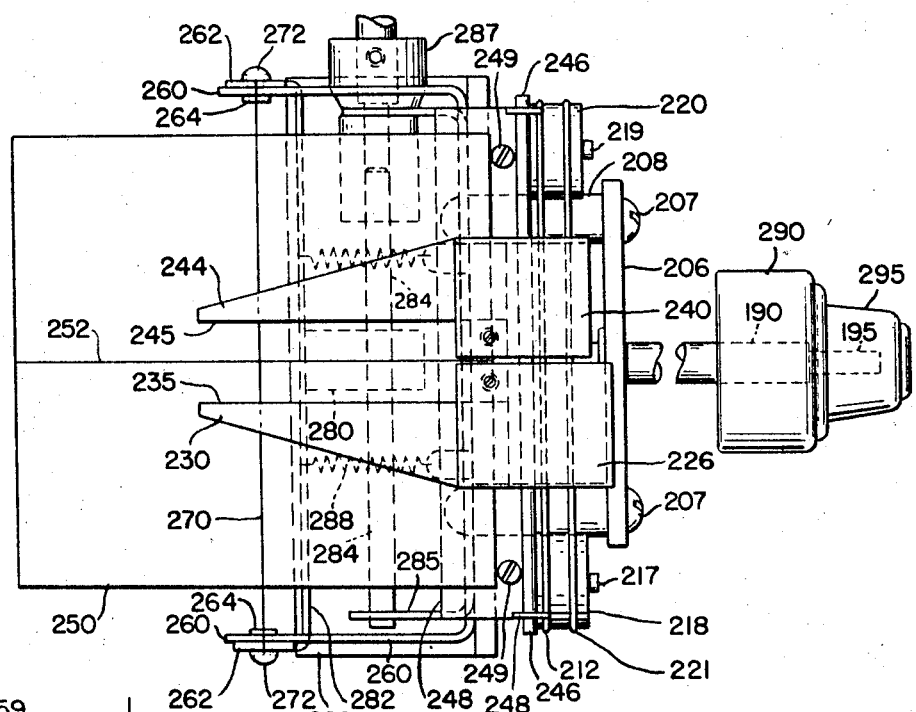
FIG.8
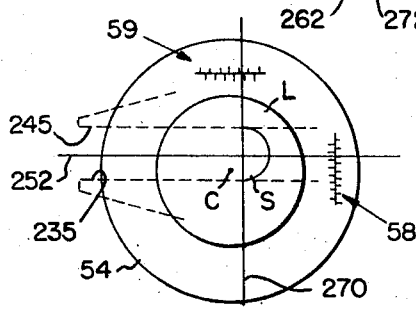
FIG.9

United States Patent Office 3,451,177
Patented June 24, 1969

3,451,177
LENS BLOCKER
Lloyd A. Buckminster, Geneva, and William A. Washburn, Phelps, N.Y., assignors to Textron Inc., Providence, R.I., a corporation of Rhode Island
Filed Jan. 26, 1966, Ser. No. 523,211
Int. Cl. B24b 19/00
U.S. Cl. 51—277                                    19 Claims

ABSTRACT OF THE DISCLOSURE

Two vertically spaced turrets are independently pivotable on a base about a common vertical axis. The lower turret carries two, graduated, transparent discs, each having pins for supporting thereon a lens blank, and each being registrable selectively through an opening in the base with adjustable lens blank locating means. A lamp projects superimposed images of the locating means, and the registering disc and lens blank, onto an image-receiving screen carried by the upper turret, so that a lens blank may be adjusted on its support pins in accordance with a prescription. Two molds are movable into registry with the discs to engage and clamp the blanks thereon after each blank has been located properly. The upper turret carries a container for a measured supply of molten blocking material which can be swung into operative registry with the two molds selectively, whereby one blank can be adjusted and blocked while the block of a previously blocked blank is cooling.

---

This invention relates to lens blocking apparatus, and more particularly to apparatus capable of performing the combined operations of locating and blocking a lens blank in preparation for the grinding of its edge.

It is conventional practice in manufacturing an ophthalmic lens to grind and polish the lens blank on each of its two surfaces or sides, and then to grind it on its perimeter or edge.

Before commencing the edge-grinding operation on a lens blank at least one surface of which has been finished, it has been necessary in the case of certain prior apparatus first to place the blank, for example a bifocal lens blank, in a marking device in order to locate and mark with ink or the like the positions of the reading segment, axis and optical center of the blank in accordance with the prescription requirements; and thereafter to remove the blank from the marking device, and to place it in accordance with the marks thereon in a blocking device, which, by way of example, may serve to cast or secure to one face of the lens blank a block, which is suitable for holding the blank thereafter in an edge-grinding machine. Both the marking and blocking devices described above have been relatively complex and expensive, and have not been satisfactorily accurate. Moreover, there is a likelihood that the blank will be damaged, or the marks thereon will be smeared or erased, during the transfer of the blank from the marking to the blocking device.

An object of this invention is to eliminate the need for marking a lens blank before blocking it for the lens edging operation.

A further object of this invention is to provide a novel lens blank a block, which is suitable for holding the blank can be located and blocked in a relatively simple, accurate and inexpensive manner.

Another object of this invention is to provide a device of the type described which minimizes the manual operations necessary to execute rapidly and successively both the locating and blocking of an unmarked lens.

A still further object of this invention is to provide a novel blocking device having a pair of mold blocks for successively blocking two different lens blanks, and means for supplying predetermined quantities of molten blocking material to each mold block.

Still another object of the invention is to provide means for blocking a lens which will enable the blocked lens to be taken out of a lens bevel-edging machine for inspection, for instance, and to be returned to the machine for completion of the bevel-edging operation without any possibility of error in the mounting of the lens in the machine.

Other objects of the invention will be apparent hereinafter from the specification and from the recital of the appended claims, particularly when read in conjunction with the accompanying drawings.

In the drawings:

FIG. 6 is a fragmentary sectional view taken along the line 6—6 in FIG. 4;

FIG. 7 is a fragmentary sectional view taken along the line 7—7 in FIG. 5;

FIG. 8 is an enlarged, fragmentary sectional view taken along the line 8—8 in FIG. 1; and FIG. 9 is a schematic view of the images which appear on the screen, which forms part of this device, when a lens blank is being located in the device prior to its being blocked.

Figure 1:
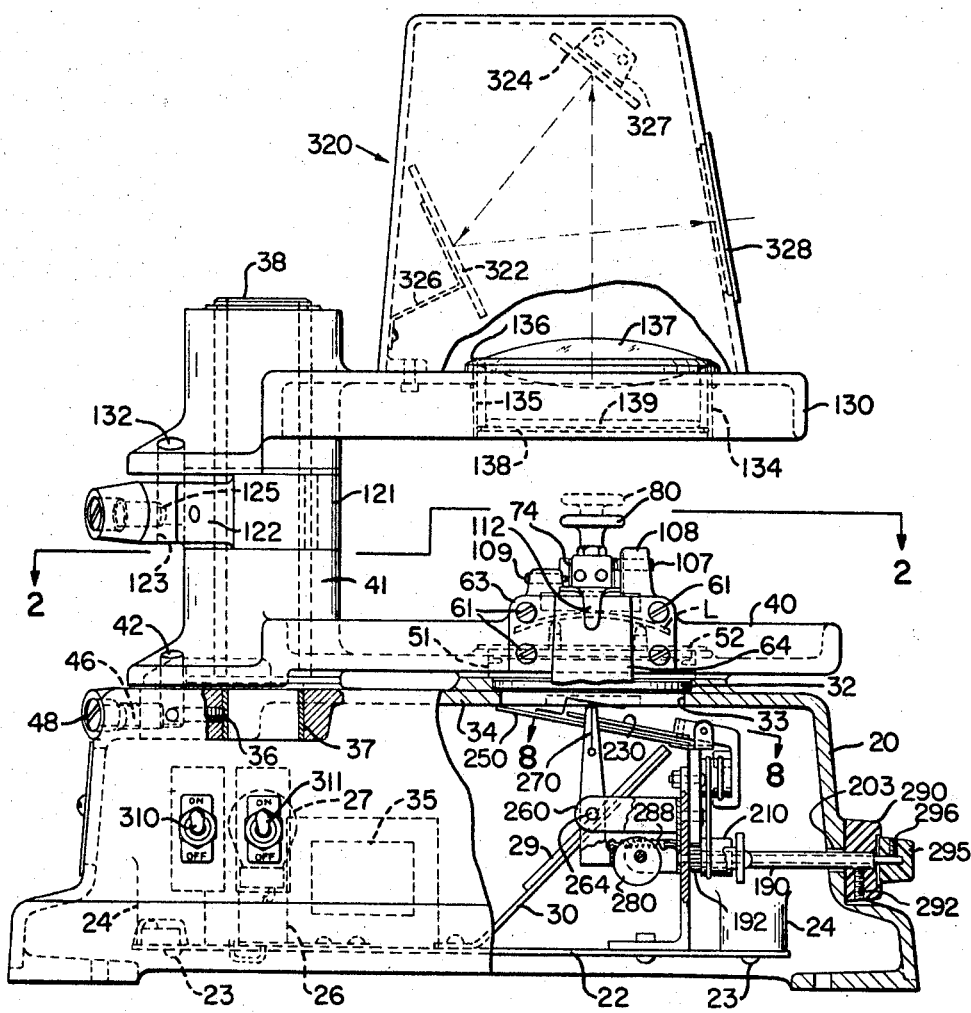
FIG. 1 is a side elevational view of lens locating and blocking apparatus made in accordance with one embodiment of this invention, portions of the apparatus being cut away and shown in section.

In the illustrated apparatus, a plurality of transparent segment-locating members are adjustably mounted in the base below a transparent disc. Two vertically spaced turrets or platforms are mounted to pivot on the base above the disc about a common vertical axis. The lower turret carries two spaced, transparent reticle plates, each of which has marked thereon two sets of graduations that extend at right angles to one another. Each plate also carries a plurality of pins for supporting thereon a lens blank having therein a reading segment. Mounted at each side of the lower turret to swing over and clamp a lens blank onto the pins carried by the adjacent reticle plate is a member carrying a mold which has therethrough a vertical cavity. Mounted on the upper turret are a horizontal image-receiving screen, and a reservoir for molten lens-blocking material. The screen is viewable through a magnifying lens carried by the upper turret.

In use the two turrets are swung into first positions in which the screen and one of the reticle plates register vertically with the transparent discs; and light from a lamp in the base is directed upwardly and successively through the locating members, the disc, and the registering reticle plate to the screen. This projects onto the screen images of the locating members and the graduations on the registering reticle plate. The locating members are then adjusted to move their images relative to the images of the graduations in accordance with the prescribed dimensions and location of the reading segment in a finished lens. A lens blank is then placed on the supporting pins carried by the registering reticle plate, and is manually adjusted until the image of its reading segment resiliently and sealingly engaged with the upper suring members. The adjacent mold is then swung over the top of the lens blank, and the lower end of its cavity is resiliently and and sealingly engaged with the upper surface of the blank, thereby clamping the latter against movement on the supporting pins. The upper turret is then swung to its second position in which a nozzle at the bottom of the reservoir registers with the upper end of the mold cavity; and a measured amount of molten blocking material is poured through the nozzle and the mold cavity against the upper face of the lens blank. When this material cools it adheres to the blank to provide a block for holding the blank in a machine for a subsequent operation thereon.

While the blocking material in one mold block is cooling and adhering to a first lens blank, the lower turret is swung to place its second reticle plate in registry with the disc, and the upper turret is swung back to its first position to place the screen in registry with the second reticle plate and disc. In this manner a second lens blank may be located while the block is adhering to the first blank.

Referring now to the drawings by numerals of reference, and first to FIGS. 1 to 5, 20 denotes the hollow base of the apparatus. Mounted on a horizontal plate 22 (FIG. 1), which is secured by screws 23 to lugs 24 that are integral with the side walls of the base 20, is a receptacle 26 for an electric light bulb 27. The bulb is positioned adjacent the left end of the base (FIG. 1), and the light therefrom is reflected by the surface of a mirror 29 vertically upwardly through a glass disc 32. The mirror is supported on a bracket 30 that extends diagonally upwardly from the plate 22 adjacent the forward, right-hand end of the base. Disc 32 is mounted in an opening 33 formed in the horizontal upper wall 34 of the base 20. Current is supplied to bulb 27 through a transformer 35 mounted in base 20.

Secured at its lower end by a set screw 36 in an opening 37 formed in the wall 34 adjacent the rear of the base is a vertically-disposed hollow trunnion or post 38. Mounted on the trunnion 38 to swing horizontally thereabout is a turret 40 having an integral collar portion 41 which is journaled on trunnion 38. Collar 41 carries a stop pin 42, which projects at its bottom into an arcuate slot 43 (FIG. 2), which is formed in the upper wall 34 of the base 20 in radially spaced, coaxial relation to the post 38. Stop pins 44 and 44' which are threaded into wall 34 cooperate with pin 42 to limit the swinging movement of the turret in opposite directions.

Mounted to reciprocate in each of a pair of angularly spaced holes 45, which extend through wall 34, radially of post 38, and which communicate at their inner ends with slot 43 is a hollow spring-loaded detent 46. Each detent 46 is urged resiliently into slot 43 by a coiled spring 47, one end of which is seated in the inner end of the detent and the opposite end of which engages the inner end of an adjusting screw 48 threaded into a counterbore 49 formed in the outer end of corresponding hole 45. At its outer end each detent 46 has an external flange 50, which reciprocates in the counterbore 49 for the associated screw 48, and which limits inward movement of the detent under urging of its associated spring 47. In use, the turret may be swung about post 38 into one of two limit positions, in each of which pin 42 is held resiliently by one of the detents 46 against either one or other of stops 44 or 44'.

Press-fit or otherwise secured in each of a pair of horizontally spaced vertical openings 51 in the turret 40 is ring 52. Each ring 52 carries a transparent reticle plate 54. Secured at their lower ends in each plate 54, and projecting upwardly therefrom are three angularly-spaced lens supporting pins 56. Engraved or otherwise inscribed on each plate 54 are two sets of graduations 58 and 59, which are disposed at opposite sides of turret 40 are and 9).

Figure 4:
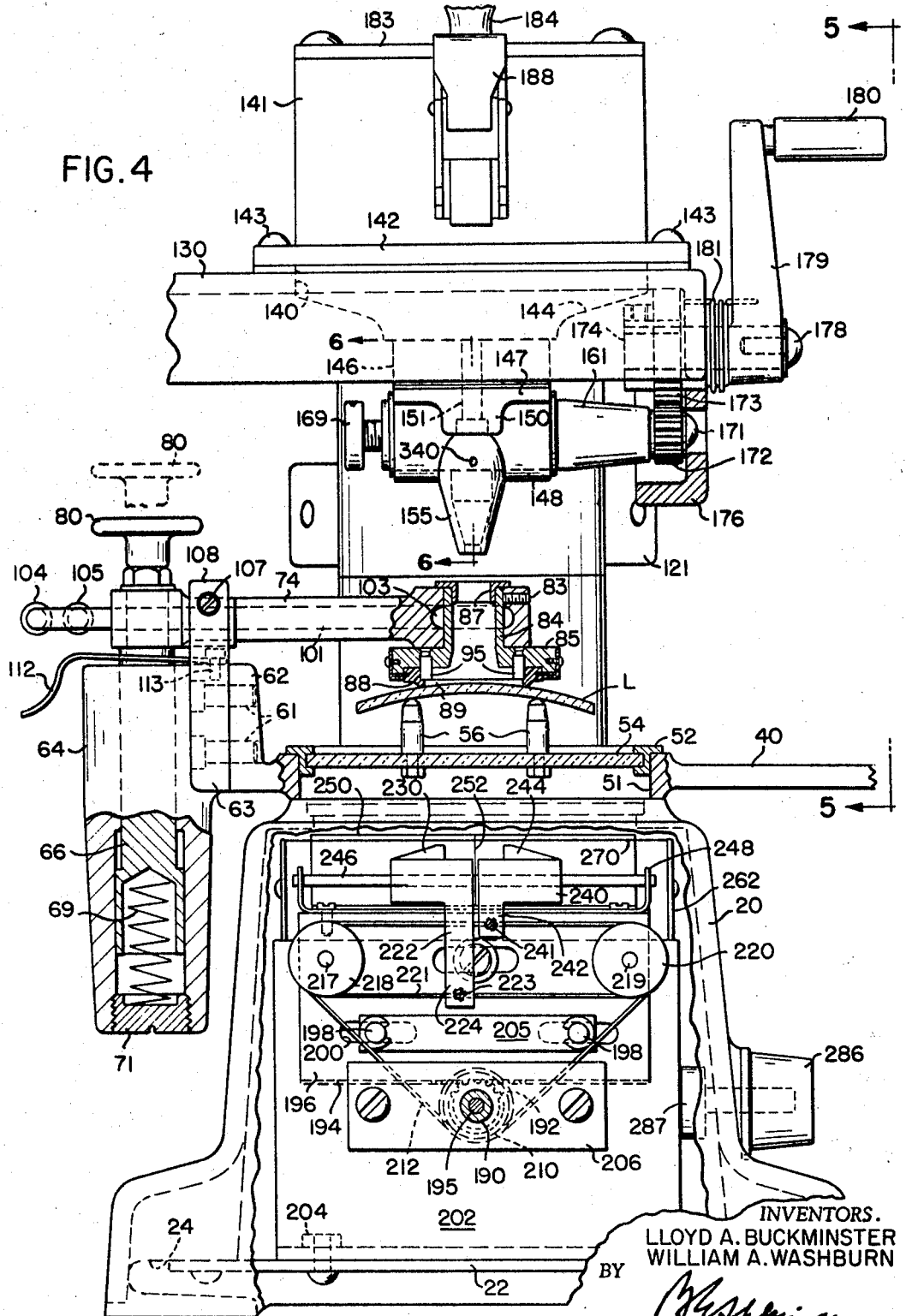
FIG. 4 is an enlarged, fragmentary front elevational view of the apparatus with parts thereof cut away.

Secured by screws 61 (FIGS. 1, 2 and 4) to pads 62, which are disposed at opposite sides of turert 40, are brackets 63. Each bracket 63 is formed with an integral, vertically disposed bearing 64. Mounted for rotation and for limited vertical reciprocation in each bearing 64 is a shaft 66 (FIG. 4). Each shaft 66 is urged resiliently upwardly by a coiled spring 69, which seats at one end in a blind bore formed in the lower end of each shaft, and at its opposite end against a screw 71, which threads into the lower end of the bearing.

Figure 2:
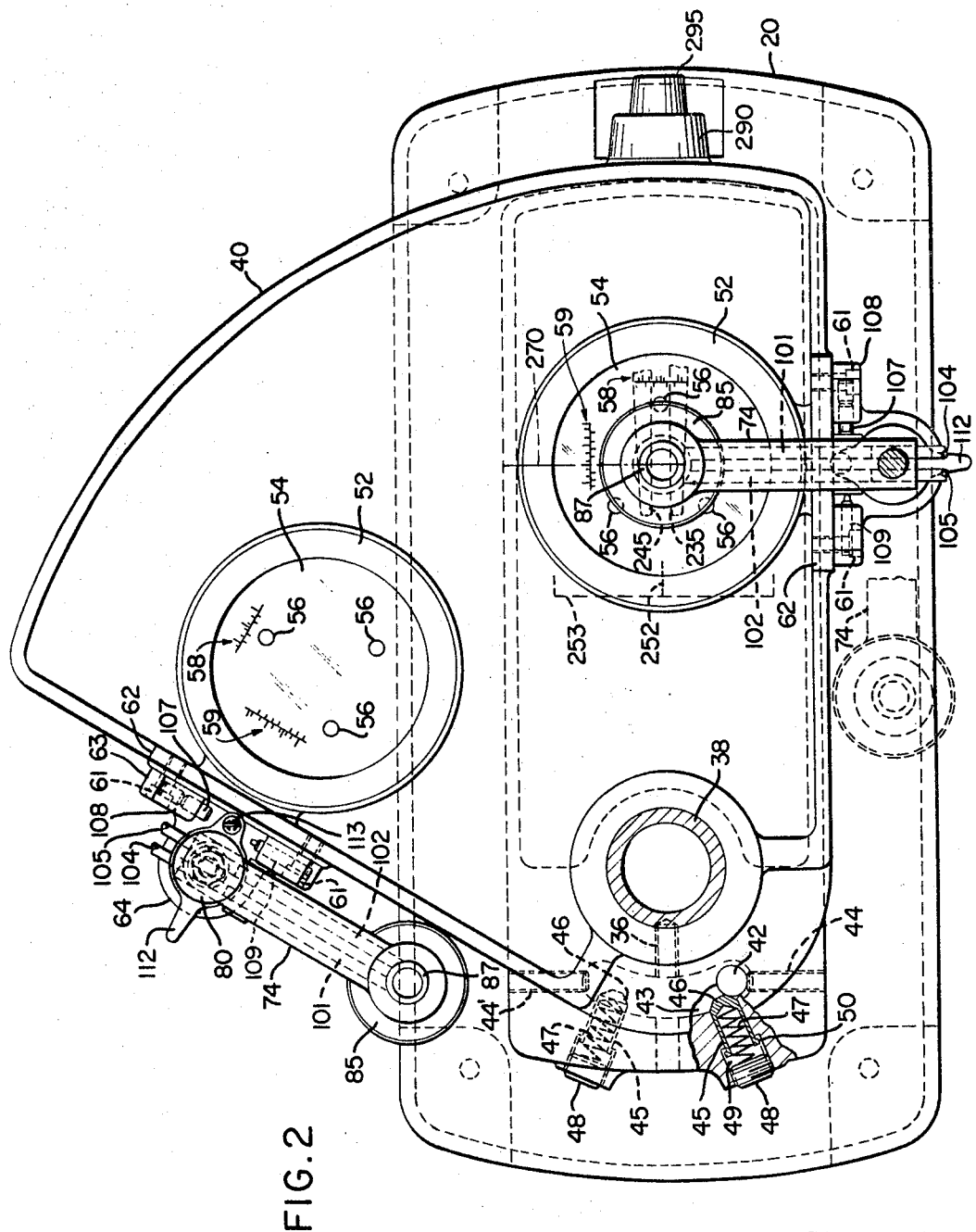
FIG. 2 is a sectional view taken along the line 2—2 in FIG. 1, with portions of the apparatus again being cut away.

Mounted on the upper end of each shaft 66 for pivotal movement thereby into and out of operative relation with a reticle plate 54 is a lens clamping arm 74 (FIG. 2). At one end thereof each arm 74 is secured on a reduced diameter portion of its associated shaft 66 by a knob 80 which threads onto the upper end of the shaft.

Secured by a set-screw 83 (FIG. 4) in the opposite or free end of each arm 74 is a hollow molding block 84, which has at its lower end an integral circumferential flange 85 (FIGS. 2 and 4) whose upper face seats against the underside of the associated arm 74. Secured in the upper end of each mold block is a nozzle seat 87, which has a conical mouth. Secured in a counterbore in the bottom face of each flange 85 is a rubber or neoprene seal ring 88, the lower end of which is formed with an annular rib 89, which is adapted sealingly to engage the convex surface of a lens blank L (FIGS. 1 and 4) supported by the pins 56. Riveted or otherwise secured at their upper ends to each flange 85 and projecting downwardly therefrom into the bore of each ring 88 at diametrally opposite sides thereof are at least two pins 95.

Each arm 74 is provided with two spaced, parallel ducts 101 and 102 (FIGS. 2 and 4). These communicate at their inner ends with an annular groove 103 (FIG. 4) that is formed around the associated molding block 84; and these are connected at their opposite ends to two flexible hoses 104 and 105, respectively. The hose and ducts are adapted to convey coolant, through each arm 74 to t he corresponding groove 103. The hose being flexible do not interfere with the swinging movement of the arms 74.

When either arm 74 is in its inoperative position, its associated shaft 66, and the knob 80 thereon as is illustrated by broken lines in FIGS. 1 and 4, are held in their uppermost positions by the associated spring 69. Either arm may be moved to operative position by swinging it across the top of the turret 40 until one side of the arm engages a stop 107, which is adjustably threaded in, and projects from, a lug 108 that is integral with bracket 63. In this position the associated molding block 84 will be positioned precisely above and coaxially of the associated reticle plate 54. The knob 80 associated with this arm 74 is then depressed manually thereby causing the associated seal 88 to be pressed down into engagement with a lens blank L as shown for example in FIG. 4. In this position the arm 74 is engageable by a resilient detent 109 mounted in a lug opposite lug 108.

Each arm 74 is adapted to be held releasably in its lowermost position, by a leaf spring 112, which is secured at one end by a screw 113 (FIG. 4) to the top of the associated bracket 63, and which has intermediate its ends a central opening through which the associated shaft 66 is slidable vertically. Each shaft 66 has therein a peripheral groove in which the associated leaf spring 112 engages, when the shaft is pushed down, thereby to hold the shaft, and hence its associated arm 74, down against the resistance of the associated spring 69. Each shaft 66 may be released to return to its upper position merely by pressing on the outer end of its associated leaf spring 112. When the shaft 66 is released, associated arm 74 may be pivoted back to its inoperative position along one side of the turret 40.

Figure 3:
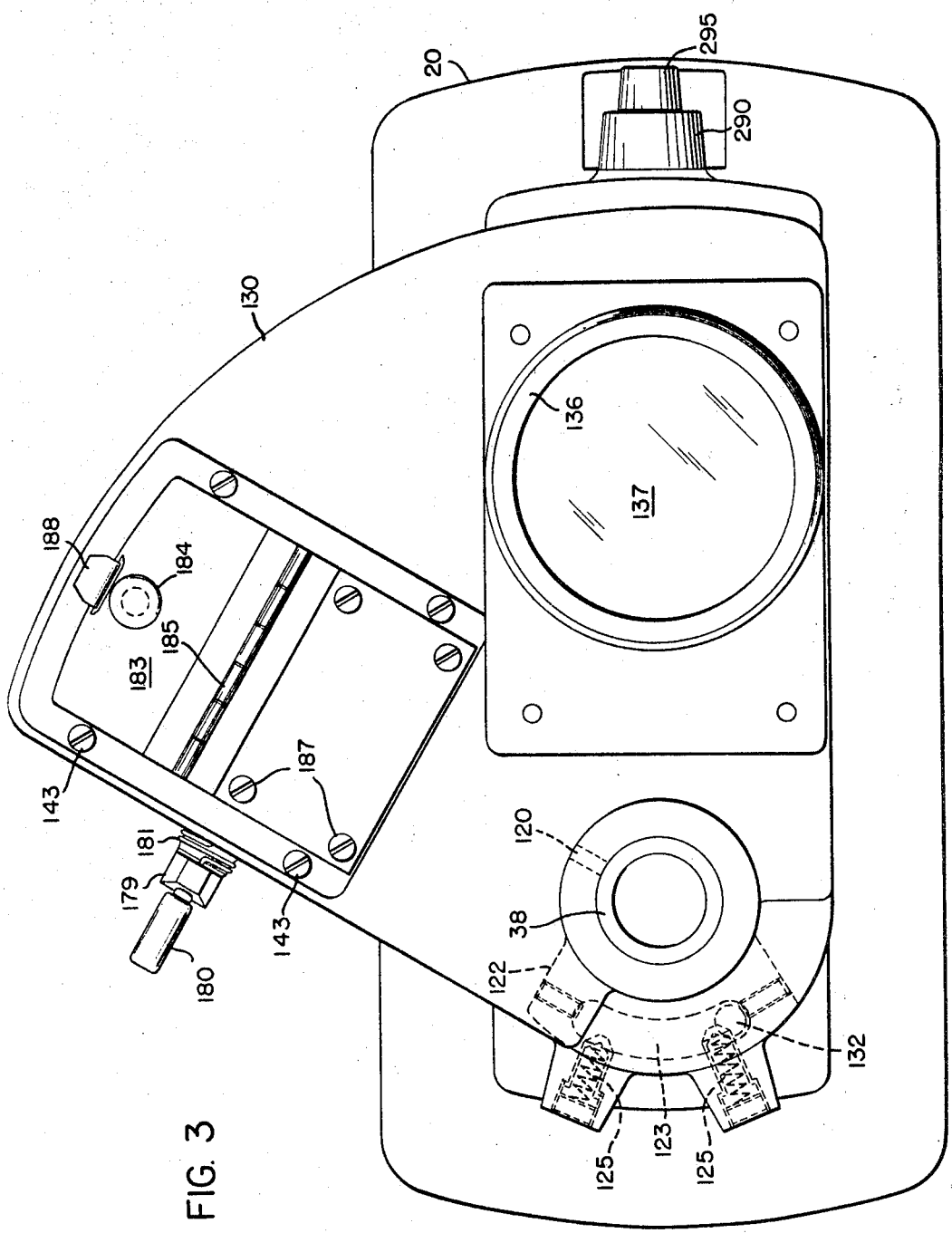
FIG. 3 is a plan view of this apparatus.

Keyed to post 38, and secured thereto above the turret 40 by a set-screw 120 (FIG. 3) is a stop collar 121 (FIGS. 1 and 3). Collar 121 is formed with a protrusion or boss 122, which has therethrough an arcuate slot 123, similar to slot 43, that is disposed in radially spaced, coaxial relation to post 38. Mounted to reciprocate in angularly-spaced openings formed in boss 122 radially of post 38, and projecting at their inner ends into the slot 123 adjacent opposite ends thereof, respectively, are two, spring-loaded detents 125. These detents 125 are similar in construction and function to detents 46, and for this reason will not be described further here.

Pivotally mounted on each post 38 above the associated collar 121 is an upper turret 130, which carries a pin 132 (FIGS. 1 and 3) that projects downwardly into the slot 123 in associated collar 121. Like pin 42 on turret 40, the pin 132 is adapted to be held resiliently against one end or the other, respectively, of the slot 123 by one of the resilient detents 125, thereby to hold the turret 130 releasably in one or other of its two limit angular positions.

Turret 130 is of essentially the same configuration as the turret 40. It is provided, however, with a vertical aperture in which is secured a sleeve 134 (FIG. 1), and a coaxial ring 135. Secured on the upper end of ring 135 by the bezel 136 is a magnifiying lens 137. Secured in the lower end of sleeve 134 between ring 135, and an O-ring 138 is a ground glass screen 139.

Figure 5:
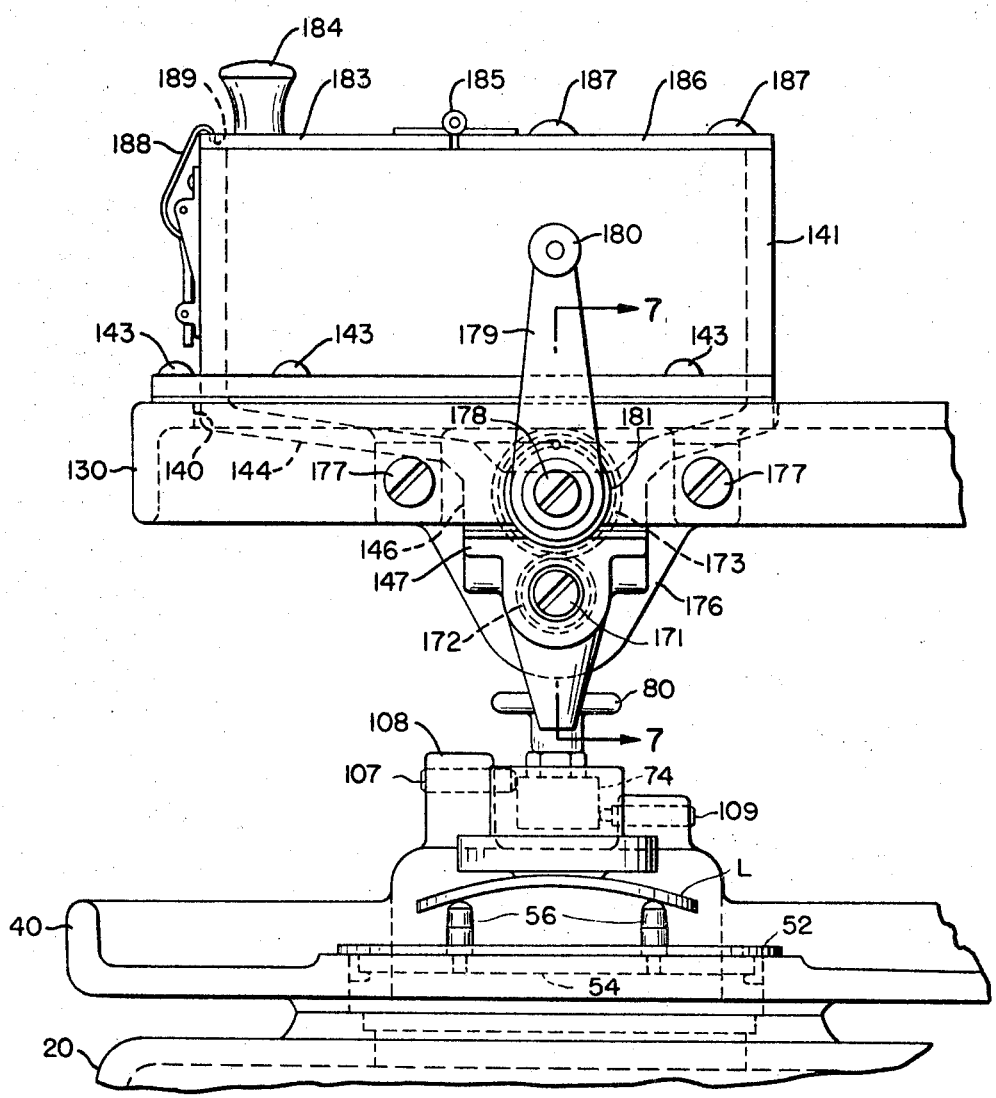
FIG. 5 is a fragmentary sectional view taken along the line 5—5 in FIG. 4.

Mounted over a further vertical opening 140 (FIGS. 3, 4 and 5) formed in turret 130 is a generally rectangular pot or reservoir 141, which is formed around its bottom with an external integral flange 142. Reservoir 141 is secured on turret 130 by screws 143 which pass through this flange. The reservoir 141 projects downwardly through opening 140, and has in its bottom 144 an opening, which is surrounded by an annular boss 146. The bottom of the reservoir inclines downwardly toward this opening as shown in FIG. 5. Secured over the lower end of boss 146 by screws 151 (FIG. 4), which pass through holes in its shoulders 150 (FIGS 4 and 6), is the base plate 147 of a nozzle 155. Integral with base plate 147 is a collar 153 and a horizontally disposed sleeve 148. The bore of sleeve 148 communicates through a port 157, collar 153, and boss 146 with the interior of the reservoir 141. The nozzle 155 is integral with and projects downwardly from sleeve 148, and through a further port 158 communicates with the bore of the sleeve.

Mounted to rotate in the bore of the sleeve 148 coaxially thereof is a valve or shaft 161 (FIGS. 6 and 7), which is formed intermediate its ends with a pocket 162. The valve is held against axial movement in sleeve 148 by two C-rings 164. Leakage along the valve stem is prevented by two O-rings 165.

Adjustably threaded into a bore 167 in one end (FIGS. 4 and 7) of valve 161 to communicate at its inner end with pocket 162 is a screw 169. Secured by a screw 171 to the opposite end of the valve is a pinion 172 (FIGS. 4 and 5). The pinion 172 meshes with a gear 173, which is secured to a shaft 174 that is journaled in a bracket 176 on turret 130 to rotate about an axis parallel to the axis of pinion 172. Bracket 176 is secured by screws 177 (FIG. 5) to the skirt of turret 130. Secured by screw 178 to the outer end of shaft 174, is a crank 179 which may be rotated by a handle 180. A torsion spring 181, which surrounds shaft 174 and is connected at one end to the handle 179, and at its opposite end to bracket 176, constantly urges the handle 180 to a position, in which the pocket 162 registers with the port 157 as illustrated in FIG. 6. Handle 179 may be rotated to invert pocket 162 to register it with port 158 and nozzle 155.

The reservoir 141 is adapted to contain a molten blocking material, such as a metal alloy. It is provided with a hinged half-cover 183 having a knob 184 by which it may be swung about hinge 185. The hinge 185 is carried by stationary half-cover 186, which is secured by screws 187 over the rear half of the reservoir 141. A conventional clamp 188 is hingedly mounted on the front of the reservoir 141 releasably to engage a notch 189 in cover half 183 to hold the latter releasably closed.

Journaled in base 20 in front of mirror 29 is a hollow shaft 190 (FIG 1). Journaled in this shaft 190 is a second shaft 195 to which is secured a pinion 192 (FIG. 4) that meshes with a rack 194 which is integral with the lower end of a slide 196. Slide 196 slides, within the limits allowed by pins 198 and slots 200, on the upright portion of a right-angular bracket 202 (FIGS. 1 and 4), which extends transversely between opposite sides of base 20. Pins 198 are secured at their outer ends in a plate or strap 205 that holds slide 196 on bracket 202. Bracket 202 is fastened on plate 22 by screws 204. Hollow shaft 190 is journaled in bushing 203 (FIG. 1) in base 20 and in outboard supporting strap 206 (FIG. 8) which is supported from the upright portion of bracket 202, by studs 207 that carry spacers 208.

Fastened to hollow shaft 190 is a pulley 210 which drives spaced parallel pulleys 218 and 220 through an endless belt 212 which passes over all three pulleys. Pulleys 218 and 220 are journaled on studs 217 and 219 that are fastened in slide 196.

The pulleys 218 and 220 have two grooves, each; and an endless belt 221 operates in the second grooves of these two pulleys and is driven by them.

Secured to the lower reach of belt 221 by a pin 223 is an obtuse angular bracket 222 to whose upper leg 226 there is fastened a transparent plastic strip 230 (FIGS. 1, 4 and 8), which projects rearwardly beneath the opening 33 in the top of base 20. Secured to the upper reach of the belt 221 by a pin 241 is an obtuse angular bracket 240 to whose upper leg there is fastened a second transparent plastic strip 244, which also extends beneath the opening 33.

The strips 230 and 244 are of general triangular shape in plan and have parallel straight confronting side edges 235 and 245, respectively (FIG. 8), which between them are intended to define the width of the segment portion S of a bifocal lens blank L (FIG. 9). By rotating the pulleys 218 and 220 in one direction, the distance between side edges 235 and 245 can be increased, while by rotating these pulleys in the opposite direction, the distance between these side edges can be decreased. Thus the spacing of edges 235 and 245 can be defined in accordance with the desired width of segment S (FIG. 9).

The brackets 222 and 240 are mounted on a rod 246 which is fixed at its opposite ends in a generally U-shaped support 248 secured to slide 196 by screws 249. Thus the strips 230 and 244 move with slide 196 to shift them laterally in accordance with the desired position of the segment S (FIG. 9) laterally of the lens blank.

The shaft 190 can be rotated to rotate pulleys 210, 218, 220, in either direction by rotation in either direction of knurled knob 290 (FIG. 1) which is secured to shaft 190 by a set screw 292. The shaft 195 (FIGS. 1 and 4) can be rotated to rotate pinion 192 and shift slide 196 laterally by rotating knurled knob 295 which is secured to shaft 195 by set-screw 296.

Disposed beneath the strips 230 and 244 is a transparent plate 250 (FIGS. 1 and 8) which is supported on a rearwardly projecting arm of bracket 248. The plate 250 has a center line 252 (FIG. 8) inscribed thereon which reads against the graduations 58 (FIG. 2) on one of the reticle plates 54, so that the slide 196 can be adjusted precisely in accordance with the desired off-center position of the reading segment S of the lens blank.

Fastened to the upright portion of bracket 202 (FIG. 1) is a U-shaped bracket 260 whose parallel legs extend rearwardly. Pivotally mounted on the left end of bracket 260 by pins 264 is another U-shaped bracket 262 between the upper ends of which there is fastened a cord 270 (FIGS. 4 and 8). This cord is held taut by means of the screws 272 which fasten its ends to the legs of bracket 262.

The bight portion 282 of bracket 262 engages the periphery of an eccentric 280 (FIG. 1) which is secured to a shaft 284 that is journaled at one end in a U-shaped bracket 285 that is fastened by screws 207 to the upright portions of bracket 202. A knurled knob 286 (FIG. 4) is secured by a coupling 287 to shaft 284 to rotate this shaft manually to rock arms 262 and cord 270 (FIG. 1) about the axis of pins 264, thereby to position cord 270 in accordance with the desired position of the upper edge of the segment portion S (FIG. 9) of the lens blank. Coil springs 288 (FIG. 1) hold the bight portion 282 of bracket 262 constantly in engagement with eccentric 280.

In use, the reservoir 141 is loaded with metal alloy; and conventional switches 310 and 311 (FIG. 1), which are mounted on base 20, are tripped. Switch 310 controls lamp 27 whose light is reflected by mirror 29 upwardly through transparent plate 32. Switch 311 may be utilized to control a heater coil (not illustrated) in reservoir 141 to maintain the alloy therein molten. The operator then swings turrets 40 and 130 to register one of reticle plates 54 and the lens 137 coaxially above plate 32. The images of graduations 58 and 59 on the registered plate 54, the straight edges 235 and 245 of strips 230 and 244, the centerline 252, and the cord 270 will then be projected onto the screen 139, and will be viewable through lens 137.

A housing 320 (shown only in FIG. 1) may be mounted on turret 130 over lens 137. Mounted in the housing by brackets 326 and 327, respectively, are mirrors 322 and 324; and a transparent plate 328 is mounted in an opening in the forward wall of the housing. The mirrors 322 and 324 are inclined to one another and to plate 328 in such manner that the images on screen 139 are enlarged by lens 137, and are projected by mirrors 324 and 322 through plate 328 so that the operator may view the images without bending over the top of lens 137.

The operator then adjusts slide 196 by rotation of knob 295 (FIG. 1) to shift plate 250, and hence line 252 (FIG. 9), laterally in accordance with the prescribed lateral position of the reading segment S right or left of the optical center C of a given lens blank, and rotates knob 290 so as to adjust the distance between the straight edges 235, 245 to conform to the desired width of segment S and to disposed them at opposite sides of line 252 and equidistant therefrom, reading the images of the straight edges 235, 245 and of line 252 against the graduations 58 on plate 54; and he adjusts the position of cord 270 by rotating knob 286 (FIG. 4) in accordance with the prescribed distance of the top line of reading segment S above or below the center of the lens blank, reading the image of cord 270 against graduations 59 (FIG. 9). The tilting adjustment of cord 270 about pins 264 shifts the cord forward or back depending upon the direction of rotation of knob 286.

After the above adjustments have been made a lens blank L is placed on the pins 56 on plate 54, then beneath screen 139, and its image also is projected onto the screen 139, so that the position of its segment S (FIG. 9) can be observed on the screen in relation to the positions of the straight edges 235 and 245, the line 252, and cord 270. Then by adjusting the lens blank L manually relative to the images of the edges 235, 245 and of the previously adjusted line 252 and cord 270, the lens blank can be adjusted to the desired position for blocking it.

When the lens blank L has been properly positioned on the pin 56, the operator then swings the adjacent arm 74 over the lens and pushes down on knob 80. This brings the associated gasket 88 into sealing engagement with the upper surface of the lens blank L, thus holding the blank L firmly in its adjusted position on the upper ends of the pins 56. At this time the associated leaf spring 112 will have engaged in the latching groove formed in the upper end of the associated shaft 66, whereby the arm 74 is held releasably in its clamping position against the resistance of the associated spring 69.

The operator then swings the upper turrent 130 about post 38 to bring nozzle 155 into registry with the upper end of the mold cavity 84 in the clamping arm 74. The operator then pivots valve 161 by rocking arm 179 by means of handle 180 to dump the molten metal in pocket 162 into mold 84 and into the cavity formed against the lens blank by seal ring 88. The pocket 162 holds a definite amount of molten alloy. Therefore a measured amount of alloy goes into mold 84. At this time, the peripheral surface of the shaft 161 (FIG. 6) seals port 157.

Adjacent its upper end the nozzle 155 is provided with a diagonal port or vent 340 (FIGS. 4 and 6) for permitting air to escape from the nozzle so as not to interfere with formation of the mold block against the lens blank. To increase or decrease the amount of molten material in the mold block, the screw 169 is adjusted.

The molten metal, which is dumped into mold 84, flows into contact with the upper surface of lens blank L; and when it cools, it adheres to the lens blank L to form thereon a solid block, having on its periphery a pair of diametrically opposed notches that are formed by the pins 95. These notches are used for mounting the blank in an edge grinder or other machine for finishing the lens. Cooling of the molten material can be expedited by turning the coolant into hose 104, 105, ducts 101, 102, and groove 103 (FIG. 4).

After the molten material has been dumped into the mold, and after the handle 179 has been released to permit the shaft or valve 161 to be returned by the spring 181 to its loading position as illustrated in FIG. 6, and while the molten material is cooling within mold 84, the lower turrent 40 may be swung to bring the second reticle plate 54 into registry with the opening 33 in base 20; the upper turrent 130 may be swung to bring the viewing lens 137 into registry with this second reticle plate, after which the knobs 295, 286, 290 (FIGS. 1, 4, 8) are once again adjusted, as above described, in accrodance with the prescription for a second lens blank. A second lens blank is then positioned on the pins 56 of the second plate 54 and is adjusted in the same manner as the first-mentioned lens blank, after which the second lens clamping arm 75 is swung into position to secure the second lens blank on these pins 56. Thereafter the upper turrent 130 is swung further to bring the nozzle 155 into registry with the mold 84 carried by the second lens clamping arm 74. Arm 179 is then once again pivoted to dump a measured quantity of molten metal into the mold 84 on the second arm 74. A second lens blank may thus be blocked while the block for the first-mentioned lens blank is hardening.

From the foregoing it will be apparent that the instant invention provides a relatively simple and accurate means for both locating and blocking a lens blank. Moreover, the invention disclosed herein has the advantage that it eliminates the need of marking the lens prior to its being blocked for edging. With applicant's apparatus a bifocal lens blank need be manipulated only once to establish the prescribed position of its reading segment with respect to the optical center of the blank, after which a block for holding the blank during edge-grinding may be adhered to the blank without again having to touch the latter. Moreover, with the novel apparatus disclosed herein, a second lens blank may be located and blocked while the block previously molded to a first lens blank is hardening.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:
1. Apparatus for blocking a lens blank, comprising:
 (a) a housing,
 (b) spaced support means on said housing engageable with the undersides of a plurality of a lens blanks to support the blanks in pedetermined, spaced positions on said housing,
(c) a plurality of members movable independently of one another into engagement with the upper sides of said blanks to clamp them against movement on said support means,
(d) a plurality of molds, each having a cavity which is open at one end, and each of which is movable with one of said members to dispose its open end above the upper side of one of said blanks on said support means, and
(e) means on said housing movable into registry with each of said molds for supplying molten blocking material through said cavities, when said molds are so disposed above said blanks.

2. Apparatus as defined in claim 1, including:
(a) means mounting said lens blank support means on said housing for movement relative to an opening in said housing, so that the blanks supported thereby may be moved one by one into registry with said opening,
(b) a plurality of transparent members, each of which has thereon a plurality of graduations, and each of which is mounted on said housing for movement with one of said blanks into registry with said opening,
(c) an image-receiving screen mounted on said housing above said opening, and
(d) means for projecting onto said screen superimposed images of the blank and the graduations on the transparent member registering with said opening.

3. Apparatus as defined in claim 2, wherein each of said transparent members has thereon two sets of said graduations disposed at right angles to one another.

4. Apparatus for blocking a lens blank, comprising:
(a) means engageable with the underside of a lens blank to support the blank,
(b) means movable into engagement with the upper side of said blank to clamp it against movement on said support means,
(c) a mold having a cavity which is open at one end and which is movable to dispose said end above said upper side, when said blank is clamped on said support means,
(d) means for supplying molten blocking material to said cavity when said mold is so disposed,
(e) said clamping means comprising a member which surounds said one end of said cavity resiliently and sealingly to engage said upper side of said blank when said mold is so disposed, and
(f) a first arm mounted adjacent one end thereof for limited pivotal and axial movement about a first axis,
(g) said mold being mounted in said arm adjacent the opposite end thereof for movement with said arm, and
(h) said resilient member being secured to the under side of said mold.

5. Apparatus as defined in claim 4, wherein said supply means comprises:
(a) a second arm pivoted adjacent one end thereof to swing about an axis parallel to said first axis,
(b) a container for molten blocking material mounted on said second arm for movement thereby into and out of a position above said mold, and
(c) means for feeding molten material from said container to the cavity in said mold.

6. Apparatus for blocking a lens blank, comprising:
(a) means engageable with one side of a lens blank to support the blank,
(b) clamping means movable relative to said support means to engage the opposite side of said blank and hold it against movement on said support means,
(c) a mold movable relative to said support means to register with said opposite side of said blank, and having a cavity which communicates with said opposite side through a first opening in said mold, when said blank is clamped on said support means, (d) a container for molten blocking material,
(e) means for supporting said container adjacent said mold, and
(f) means interposed between said container and said mold and operable to deliver a predetermined quantity of molten material from a port in said container to said cavity,
(g) the last-named means comprising a nozzle mounted on said container to communicate with said cavity through a second opening in said mold,
(h) a dispensing member having therein a chamber open at one end, and
(i) means mounting said dispensing member in said container for movement selectively between a first position in which the open end of said chamber registers with said port, and a second position in which said open end registers with said nozzle.

7. Apparatus as defined in claim 6, including means for adjusting the size of said chamber.

8. Apparatus for blocking a lens blank having therein a reading segment, comprising:
(a) a hollow base containing adjustable locating means,
(b) a lamp in said base for projecting an image of said locating means through an opening in said base onto an image-receiving screen mounted above said base,
(c) a plurality of transparent members on said base, and each of which has thereon a plurality of graduations,
(d) means for supporting a lens blank on each of said members,
(e) means mounting each of said members for movement selectively into registry with said opening to have its graduations, and the blank supported thereon, superimposed on said screen with the image of said locating means, for use in adjusting the last-named blank into a desired position on its supporting means,
(f) a plurality of hollow molds, each of which is movable independently of the other to an operative position to engage and clamp a blank in said desired position on its supporting means, and
(g) means for supplying molten blocking material to each mold, when it is in its operative position, to mold a block to the associated blank.

9. Apparatus as claimed in claim 8, wherein:
(a) said mounting means comprises a first turret mounted on said base to pivot about a vertical axis, and
(b) said transparent members are secured in spaced openings in said first turret for movement thereby in a horizontal plane above said base.

10. Apparatus as claimed in claim 9, including:
(a) a plurality of arms mounted on said turret to pivot about a further plurality of axes which extend parallel to the pivotal axis of said turret,
(b) each of said molds being mounted on one of said arms for swinging movement thereby into and out of clamping registry with one of said transparent members.

11. Apparatus as claimed in claim 10, including:
a horizontal plane above said first turret, and
(b) means mounting said screen on said second turret for movement thereby into and out of registry with said opening in said base.

12. Apparatus for blocking a lens blank having therein a reading segment, comprising:
(a) a transparent member having thereon a plurality of segment locating graduations,
(b) means engageable with one side of a lens blank for adjustably supporting the latter in registry with said member,
(c) means for locating the reading segment relative to said member, (d) a mold having a cavity open at one end, and movable relative to said support means between an inoperative position, and an operative position in which said one end of said cavity is closed by the opposite side of said blank, (e) means for supplying molten blocking material to said cavity, (f) a resilient member on said mold surrounding said one end of said cavity sealingly to engage said opposite side of said blank, when said mold is in its operative position, (g) means for releasably holding said mold in its operative position, (h) a housing surrounding said locating means and having therein an opening registering with said locating means, (i) a translucent, image-receiving screen, (j) means mounting said transparent member, said support means and said screen on said housing for movement into operative positions in which said transparent member, said blank and said screen register with said opening, and (k) means for projecting superimposed images of said graduations, said blank and said locating means onto said screen, when said transparent member, said support means and said screen are in their operative positions, and said mold is in its inoperative position.

13. Apparatus as defined in claim 12, wherein said mounting means comprises:

(a) a first arm supporting said screen on said housing for movement selectively into and out of its operative position, (b) a second arm supporting said transparent member and said support means on said housing for movement selectively into and out of their operative positions, and (c) a third arm supporting said mold on said housing for movement selectively into and out of its operative position independently of the movements of said first and second arms.

14. Apparatus as defined in claim 13, wherein:

(a) said first and second arms are pivoted on said housing for swinging movement about a common axis relative to one another and to said housing, and (b) said third arm is pivoted on one of the two first-named arms for pivotal movement relative thereto about a second axis which is spaced from and parallel to the first-named axis.

15. Apparatus as defined in claim 13, wherein said supply comprises:

(a) a hollow container supported on said first arm adjacent said screen for movement into an operative position adjacent said mold when the latter is in its operative position, and (b) a dispensing member movably mounted on said container and movable from a first to a second position to convey a measured quantity of molten blocking material from a hole in said container to a port in said mold, when said container is in its operative position.

16. Apparatus as defined in claim 12, wherein said locating means comprises:

(a) a first pair of members adjustably mounted in said housing to project onto said screen the images of a pair of spaced, parallel lines, which are movable toward and away from one another in response to corresponding adjustment of said first pair of members to define the width of the segment in said blank, and (b) two further members adjustably mounted in said housing to project onto said screen the images of two further lines, which intersect one another at right angles, and which are movable in response to the adjustment of said two further members to locate the center and one edge, respectively, of said segment relative to the center of said transparent member.

17. Apparatus as defined in claim 16 wherein:

(a) said first pair of members are transparent and have spaced, parallel edges for defining the first-named pair of lines, (b) one of said two further members is transparent and has inscribed thereon a line for defining one of said two intersecting lines, and (c) the other of said two further members is a cord for defining the other of said two intersecting lines.

18. Apparatus as defined in claim 14, including:

(a) a second transparent member having thereon a plurality of segment locating graduations, and mounted on said second arm in spaced relation to the first-named transparent member, and for movement by said second arm selectively into and out of an operative position in which it is disposed in registry with said opening in said housing, (b) further support means engageable with one side of a second lens blank for supporting said second blank with its reading segment disposed in registry with said second transparent member, (c) a second mold having a cavity open at one end, and (d) a fourth arm pivoted on said one arm and supporting said second mold for movement slectively into and out of an operative position in which said one end of the cavity in said second mold is positioned over and closed by the opposite side of said second blank.

19. Apparatus as defined in claim 12, including:

(a) a second transparent member, (b) means mounting said transparent members on said housing for movement selectively into registry with said opening, (c) second supporting means engageable with one side of a second lens blank for adjustably supporting the latter with its reading segment disposed in predetermined registry with the position defined by said locating means, when said second transparent member is in registry with said opening, (d) a second mold having a cavity open at one end and mounted for movement into and out of an operative position in which said one end of the cavity in said second mold is closed by the opposite side of said second blank, and (e) means for connecting said supply means selectively to the cavities in said two molds.

References Cited

UNITED STATES PATENTS

| | | | |
|---|---|---|---|
| 1,727,889 | 9/1929 | McCabe | 51—277 |
| 1,911,153 | 5/1933 | Hill | 51—277 X |
| 2,253,954 | 8/1941 | Goddu | 51—277 |
| 2,301,035 | 11/1942 | Golderer | 51—277 |
| 2,660,011 | 11/1953 | Bernheim et al. | 51—277 |
| 3,049,766 | 8/1962 | Buckminster | 51—277 |
| 3,304,586 | 2/1967 | Buckminister et al. | 51—277 X |

ANDREW R. JUHASZ, *Primary Examiner.*

G. WEIDENFELD, *Assistant Examiner.*